United States Patent [19]

Hashimoto et al.

[11] Patent Number: 4,463,387
[45] Date of Patent: Jul. 31, 1984

[54] DIGITAL VIDEO DATA RECORDING APPARATUS

[75] Inventors: Yoshitaka Hashimoto, Chofu; Kaichi Yamamoto, Zama; Norihisa Shirota, Atsugi, all of Japan

[73] Assignee: Sony Corporation, Tokyo, Japan

[21] Appl. No.: 254,741

[22] Filed: Apr. 16, 1981

[30] Foreign Application Priority Data

Apr. 18, 1980 [JP] Japan .................................. 55-59136

[51] Int. Cl.³ ....................... H04N 9/491; H04N 5/78; G11B 5/02; G11B 5/09
[52] U.S. Cl. ..................................... 358/310; 360/22; 360/32; 360/33.1; 358/341
[58] Field of Search ....................... 360/22, 32, 39, 40, 360/33.1; 364/514, 515; 358/127, 128.6, 13, 17, 310, 330, 341

[56] References Cited

U.S. PATENT DOCUMENTS 3,919,697 11/1975 Walker .............................. 360/78 X
4,224,642 9/1980 Mawatari et al. ..................... 360/32

FOREIGN PATENT DOCUMENTS 1251767 10/1971 United Kingdom .
1391686 4/1975 United Kingdom .
2023905 1/1980 United Kingdom .
2061059 5/1981 United Kingdom .
2061665 5/1981 United Kingdom .
2075792 11/1981 United Kingdom .................. 360/32

OTHER PUBLICATIONS

"Digital Television Tape Recording", International Broadcast Engineer, vol. 10, No. 164, Mar. 1979, pp. 26-28, Leeden.
NHK Laboratories Note, SN. 221m, Dec. 1977, Yokoyama et al.
"An Experimental Digital Videotape Recorder", SMPTE Journal, No. 3, vol. 89, Mar. 1980, Yokoyama et al., pp. 173-180.
General Survey Paper, "Video Technology II", Bosch, GmbH, Oct. 23, 1979.
"Multifunction Digital Video Processor", SMPTE's 14th Television Conference, vol. 3, Feb. 1-2, 1980, Kreinik et al.

Primary Examiner—Aristotelis M. Psitos
Attorney, Agent, or Firm—Lewis H. Eslinger; Alvin Sinderbrand

[57] ABSTRACT

A digitized video data recording and/or reproducing system comprises a plurality of rotary magnetic heads are disposed on a rotary tape guide drum on the periphery of which a magnetic tape is helically transported at a predetermined wrap angle. A signal processing circuit divides a digitized video signal such that each horizontal scan interval thereof contains a plurality of data blocks, and a signal distributing circuit distributes the blocks of the digitized video data sequentially to the magnetic heads, so that every nth block of each horizontal scan interval is distributed to a respective one of the heads, where n is an even integer. Preferably, there are eight blocks in each horizontal scan interval, and every fourth block is distributed to a respective head.

11 Claims, 19 Drawing Figures

FIG. 4B (AB-Channel)

FIG. 4C (CD-Channel)

FIG. 4D (A-Channel)

FIG. 4E (B-Channel)

FIG. 4F (C-Channel)

FIG. 4G (D-Channel)

DIGITAL VIDEO DATA RECORDING APPARATUS

BACKGROUND OF THE INVENTION

1. Field of the Invention

The present invention relates generally to a digitized video data recording and/or reproducing apparatus and is directed more particularly to a digitized video data recording and/or reproducing apparatus in which a color video signal is digitized and recorded by a plurality of rotary magnetic heads in time sharing manner.

2. Description of the Prior Art

As well known in the art, a video signal is conventionally frequency-modulated and then recorded on and reproduced from video tape. Recently, a digital video processing has become popular in studio equipment, so that video signal digitization is also required in a VTR (video tape recorder).

The advantages of the digital VTR are well known and need not be enumerated here. However, a high density recording is required in the VTR and to this end various recording systems have been developed up to now.

At present, however, the main investigation is directed to the digital recording of a video signal.

As is well-known, upon recording digital data for a video signal, digital data are divided into a plurality of data blocks each having a sync word, identification data, address data, and CRC data in association with the video data.

The selection of the number of blocks, and the number of rotary magnetic heads employed for recording these blocks are very important to improve the recording-reproducing quality, and also to simplify the total system.

In the prior art system, these considerations are not well-developed.

OBJECTS AND SUMMARY OF THE INVENTION

Accordingly, an object of the invention is to provide a novel digitized video data recording and/or reproducing apparatus.

Another object of the invention is to provide a digitized video data recording and/or reproducing apparatus in which audio data and video data are recorded and/or reproduced by a plurality of rotary magnetic heads.

According to an aspect of the present invention, there is provided a digitized video data recording and/or reproducing system, which comprises: a rotary tape guide drum about the periphery of which a magnetic tape is transported at a predetermined wrap angle; a plurality of rotary magnetic heads associated with the guide drum for scanning respective parallel slant tracks on the magnetic tape; a digitizer for providing a digitized video signal formed of successive horizontal scanning intervals; a signal processor stage for arranging the digitized video data of each horizontal scanning interval into a plurality of data blocks; and a signal distributor for distributing the blocks of the digitized video data sequentially to the heads, so that every nth block of each horizontal scanning is distributed to a respective head, n being an even integer such as 2, 4, 6, or 8. Preferably, eight data blocks are provided for each such horizontal scanning interval, and the even integer n is four. It is also preferred that the ratio of the number of blocks of each horizontal scanning interval to the number of rotary heads be at least two, but not more than three.

The other objects, features and advantages of the present invention will become apparent from the following description taken in conjunction with the accompanying drawings.

DESCRIPTION OF THE PREFERRED EMBODIMENT

The present invention will be hereinbelow described with reference to the accompanying drawings.

Figure 1:
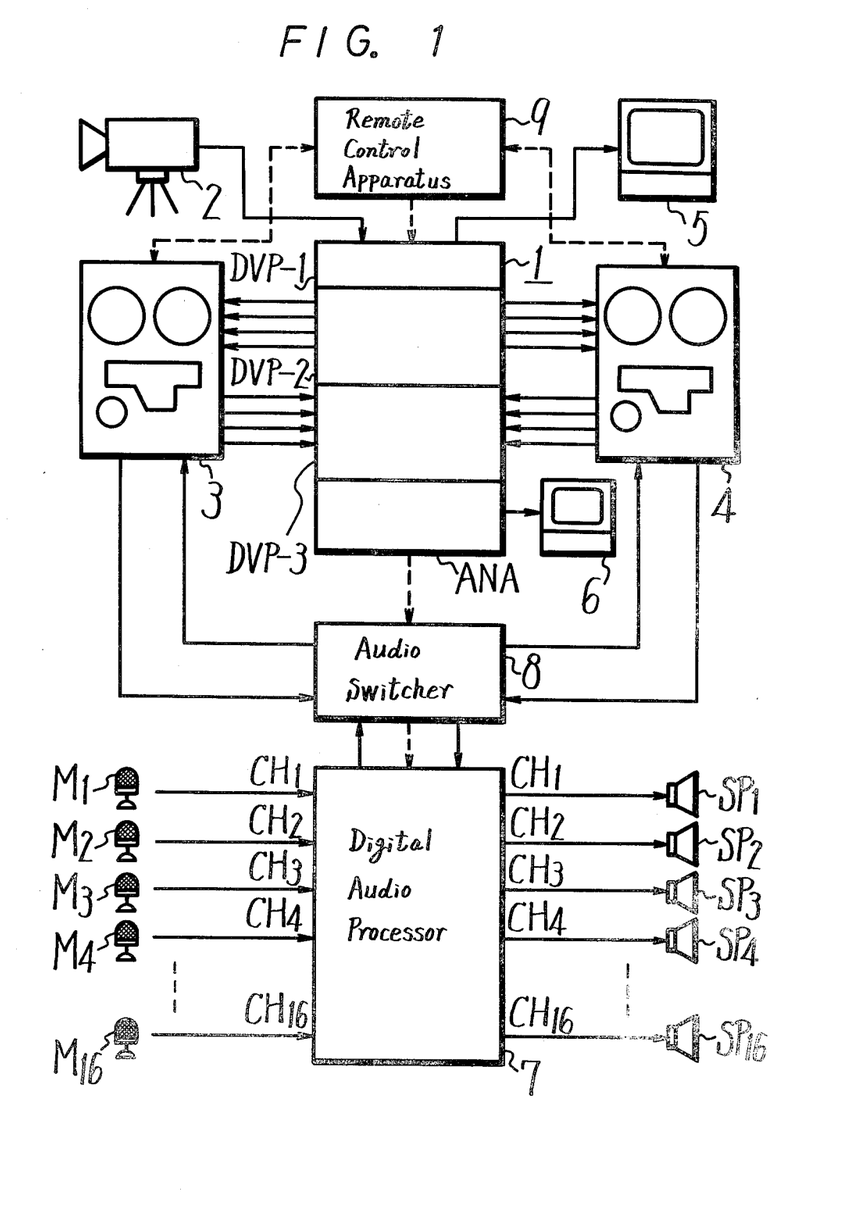
FIG. 1 is a block diagram showing a system comprising an example of the apparatus according to the present invention.

FIG. 1 is a block diagram showing an entire system incorporating digitized video and audio data recording and/or reproducing apparatus of this invention in which an editing function is also taken into consideration.

In FIG. 1, generally, reference numeral 1 designates a digital video processor which is formed of a first processor stage DVP-1 including an A-D converter, a D-A converter and a signal generator for generating various kinds of clock and timing signals, a second processor stage DVP-2 for processing digitized video signals for recording, a third processor stage DVP-3 for processing reproduced digital video signals, and a data analyzer stage ANA for carrying out an error display function.

Reference numeral 2 denotes generally a television camera, and 3 and 4 denote VTRs (video tape recorders) which are somewhat different from an ordinary VTR in their head mechanism and the associated circuit portions thereof.

Reference numeral 5 represents a monitor for displaying the reproduced video signal, and 6 represents a monitor display for displaying error conditions determined by the data analizer ANA. Further, reference numeral 7 designates generally a digital audio processor formed of a slightly modified PCM (pulse code modulation) processor that is used when an audio signal is converted to a PCM signal and then recorded and/or reproduced by a VTR.

Reference numeral 8 designates an audio switcher used to couple the digital audio processor 7 to the VTRs 3 and 4. In this case, the number of channels of the audio signals is selected as 16 channels $CH_1$ to $CH_{16}$ and a maximum of sixteen microphones $M_1$ to $M_{16}$ and speakers $SP_1$ to $SP_{16}$ respectively can be connected. Upon recording, the digital audio signal from the digital audio processor 7 is selectively supplied to the VTRs 3 and 4, while upon reproducing the reproduced signal from the VTR 3 or 4 is supplied to the digital audio processor 7 through the audio switcher 8.

Further, a remote control apparatus 9 produces remote control signals which can be utilized to control the digital video processor 1, the VTRs 3 and 4, and the digital audio processor 7 from a remote location.

Now, the recording and/or reproducing system for the color video signal and audio signal will be described in detail.

When the television camera 2 picks up an object (not shown), the color video signal derived from the television camera 2 is supplied to the first video processor DVP-1 of the digital video processor 1, and is then sampled and digitized. In this case, one television line of the color video signal, excluding the horizontal sync (synchronizing) pulse HD and burst signal BS portions, is sampled as the effective region. The vertical sync pulse and equalizing pulse portions in the color video signal of one field are not taken as an effective data and the signal in that period is not recorded. However, since a test signal such as VIR, VIT or the like is inserted in the vertical fly-back period, the number of the total effective video lines is determined to include the above test-signal lines. For example, in the case of the NTSC color video signal, the number of the effective video lines in one television field period is selected as 256 lines starting from the 10th line in each field.

Further, in the example of the invention, a sampling frequency $f_{VS}$ of the color video signal is selected as 4 times the color subcarrier frequency $f_{SC}$. To this end, the horizontal sync signal HD and burst signal BS extracted from the input color video signal are fed to a signal generator which produces a clock pulse synchronized to the burst signal BS and having the frequency of $4 f_{SC}$. A sampling pulse is generated based on this clock pulse.

The above effective portion of the color video signal is sampled based on the above sampling pulse and is A-D converted to be, for example, a parallel 8-bit digital signal.

In this case, the sampling frequency $f_{VS}$ is $4 F_{SC}$ and the color subcarrier frequency $f_{SC}$ in the case of the NTSC color video signal is expressed as follows:

$$f_{SC} = \frac{455}{2} f_H$$

where $f_H$ is the horizontal frequency. Therefore, the number of samples included in one horizontal period is 910 samples. However, since it is needless to sample the signal in the horizontal blanking period as set forth above, the number of the effective video samples in one line becomes less than 910 samples and, for example, can be 768 samples.

The digital video signal thus provided is fed to the second video processor stage DVP-2 together with the clock pulse.

Figure 2:
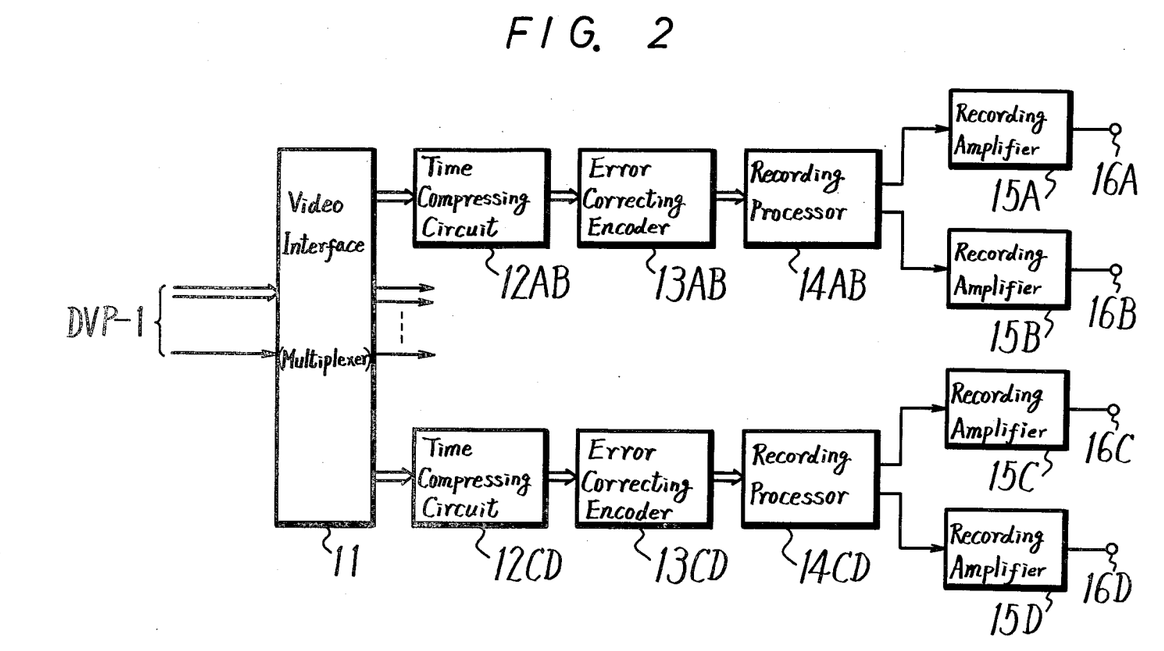
FIG. 2 is a systematic block diagram showing an example of a digital processing circuit at the recording side of a digital video processor.

The second video processor stage DVP-2 is basically constructed, for example, as shown in FIG. 2. In this example, the digital video signal and clock pulse from the processor stage DVP-1 is fed to a video interface (multiplexer) 11, where the digital video signal is processed in time-sharing manner as described later. Identification signals relating to the line, field, frame and track and various timing signals generated in the processor stage DVP-1 are supplied to predetermined circuits of the processor stage DVP-2 respectively.

Figure 4A:
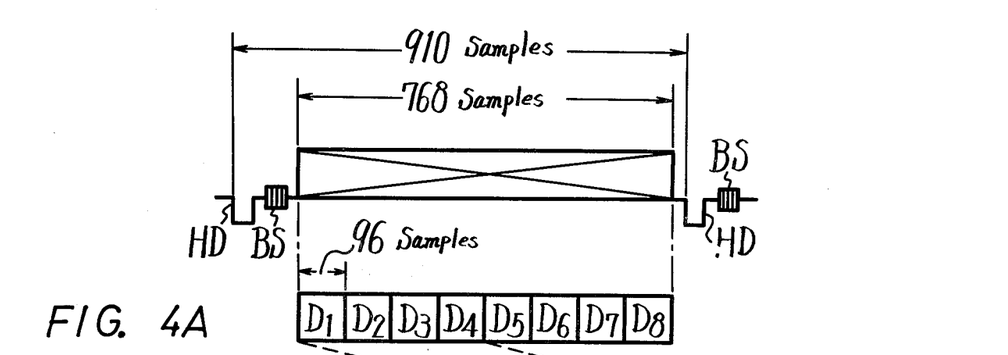
FIGS. 4A–4H and 5 are respectively diagrams used to explain the signal format when color video signal is digitally recorded.

As described above, the digital video signal is distributed to a plurality of channels and then recorded. In this invention, a plurality n of rotary magnetic heads are provided in the VTRs 3 and 4 for the video signal, and when the digital video signal is distributed to a respective n channels, the video signal data of one horizontal line are separated to into $2n$ blocks. Two blocks thereof are distributed to each channel in this example. Further in this example, n is selected as 4 (n=4). Thus, as shown in FIG. 4A, the data of one television line are separated to the data of a former ½ line and the data of a latter ½ line and the data of the former ½ line and the data of the latter ½ line are respectively divided by 4 to provide 8 data groups i.e. data groups $D_1, D_2, \ldots D_8$ each having 96 samples. Then, the former 4 data groups $D_1, D_2, D_3, D_4$ are distributed to the tracks of respective channels A, B, C, D and recorded, while the latter 4 data groups $D_5, D_6, D_7, D_8$ are distributed to the tracks of the respective channels A, B, C, D and are recorded. That is, in this case, the data groups $D_1$ and $D_5$ are recorded on a track $T_A$ of the channel A, and similarly the data groups $D_3, D_7$; $D_2, D_6$; and $D_4, D_8$ are respectively recorded on tracks $T_B, T_C,$ and $T_D$ of the channels B, C, and D.

If the data which are divided into 4 channels are processed separately at respective channels, the 4 signal processing systems are required, which can make the construction complicated and also the cost thereof high. Therefore, the A-channel, B-channel and C-channel, D-channel are respectively combined into two systems an AB-channel and a CD-channel—and then are processed in accordance with the present invention.

Figure 4B:
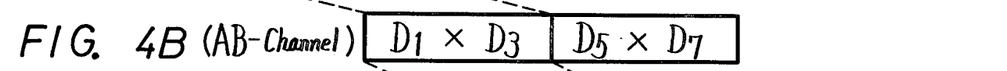
Figure 4C:
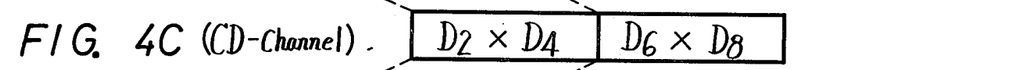
Figure 4D:
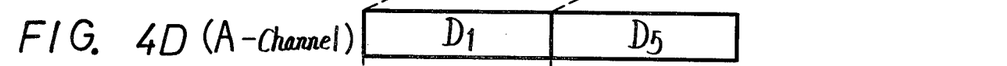
Figure 4E:
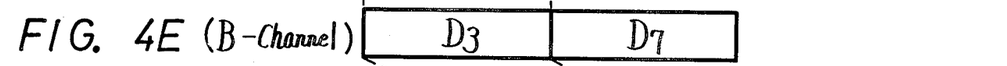
Figure 4F:
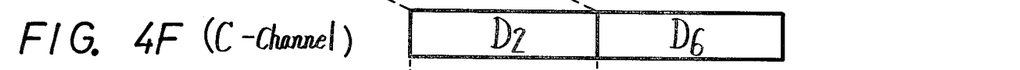
Figure 4G:
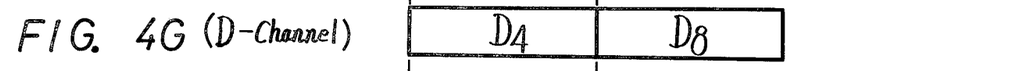

To this end, in the video interface 11 the data rate is reduced by ½ and also at the AB-channel side as shown in FIG. 4B, the data groups $D_1$ and $D_3$ are so multiplexed and processed in time sharing manner that the sample from the data group $D_1$ and the sample from the data group $D_3$ are combined alternatively and then the data groups $D_5$ and $D_7$ are so multiplexed and processed in time sharing manner that the sample from the data group $D_5$ and the sample from the data group $D_7$ are combined alternately. At the CD-channel side, as shown in FIG. 4C, the data groups $D_2$ and $D_4$ are multiplexed and processed in time sharing manner and then the data groups $D_6$ and $D_8$ are multiplexed and processed in time sharing manner.

Returning to FIGS. 2, the digital signal of the AB-channel thus derived from the video interface 11 is fed to a time base compressing circuit 12AB and the digital signal of the CD-channel is fed to a time base compressing circuit 12CD. There, these signals are time-base-compressed at a predetermined ratio for accomodating error correcting codes, and data format converted for recording.

The time-compressed digital data of the video signals of both the AB- and CD-channels from the time base compressing circuits 12AB and 12CD are respectively fed to error correcting encoders 13AB and 13CD and then to recording processors 14AB and 14CD. In the error correcting encoders 13AB, 13CD and recording processors 14AB, 14CD, the video signal data which are multiplexed at every sample are respectively processed at every sample in time sharing manner. In other words, the samples of the same data groups in the respective data groups $D_1, D_2, \ldots D_8$ are signal-processed within that sample unit and also the data rate thereof is reduced further by $\frac{1}{2}$ (i.e., reduced by $\frac{3}{4}$ from the rate of the original sample data). Namely, in view of signal process as shown in FIGS. 4D, 4E, 4F and 4G, the signal process is carried out with the respective channels A, B, C and D separately.

Figure 4H:
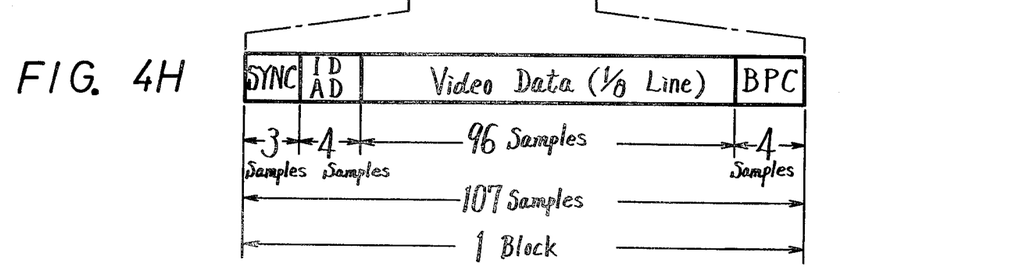
Figure 5:
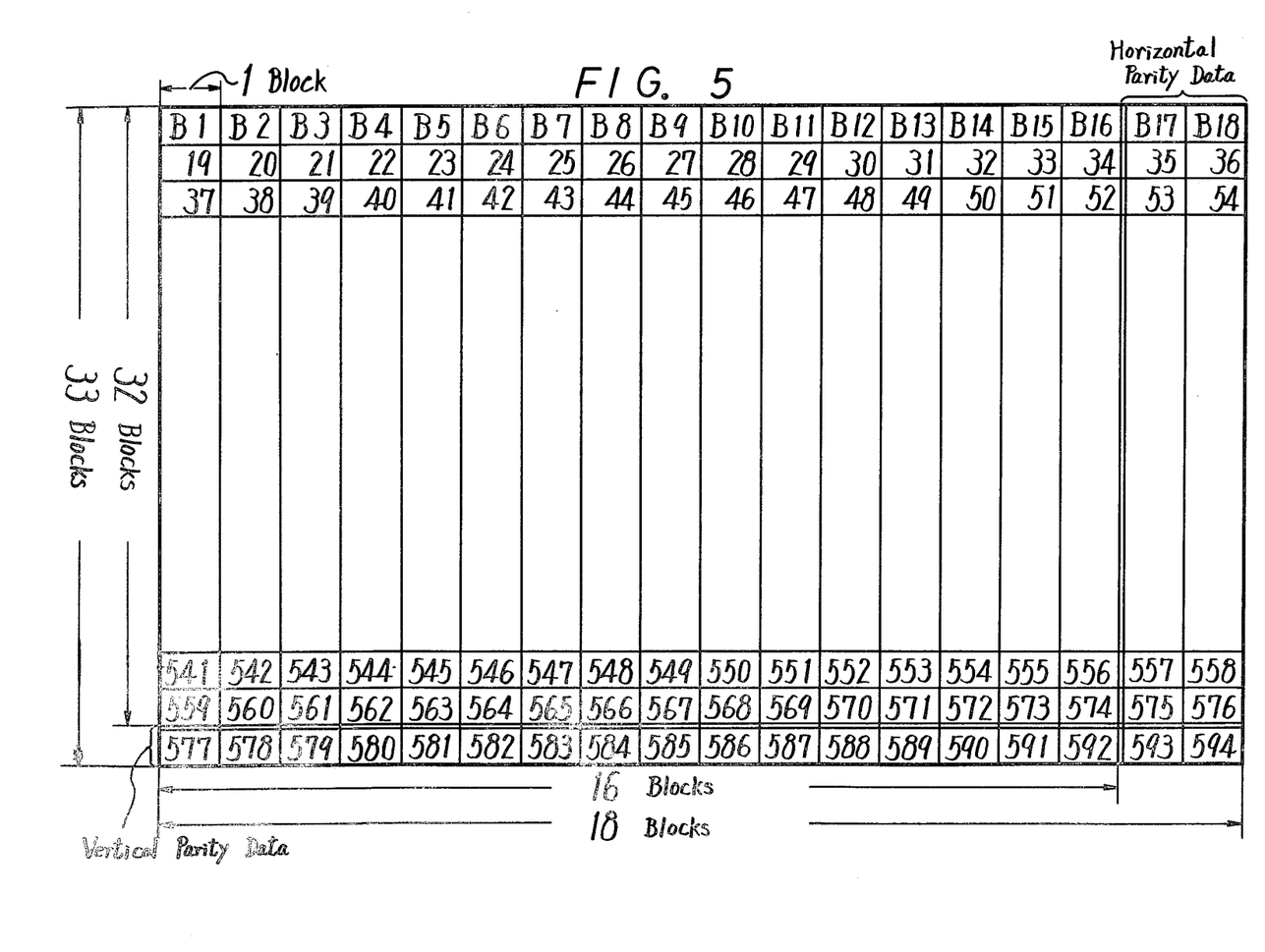

As described above, the video signal data are processed in a time sharing manner in the error correcting encoders 13AB, 13CD and the recording processors 14AB, 14CD and converted into signals with the formats shown in FIG. 4H and FIG. 5.

That is, in the above example, one block B is assigned to every one of the data groups $D_1, D_2, \ldots D_8$ (each has data of 96 samples) of $\frac{1}{8}$ line of the video signal. As shown in FIG. 4H, this block B further includes a block sync signal SYNC of 3 samples (24 bits) and an, a combined identification signal ID and address signal AD of 4 samples (32 bits), and also a block parity data BPC of 4 samples (32 bits). In this case, the sync signal SYNC is used to extract the signals ID, AD, the data, and block parity data BPC upon reproduction.

The identification signal ID shows classifications of the channels A, B, C and D and the frame and field, and the address of the block B. The block parity data BPC is used to detect an error in the data upon reproduction and also to correct the error of the data within one block B.

Further, as to one field of every channel, the data are processed to have the following structure. That is, FIG. 5 shows the data structure of one channel of the video signal data in one field, in which two blocks B represent data from one line of the video signal ($\frac{1}{4}$ line). In this case, the numerals marked on the respective blocks B corresponds to the above-mentioned address AD.

In case of the NTSC system color video signal, if the number of the effective video lines is selected as 256 as set forth above, the number of blocks of one field in each channel is 512. Since, however, 16 blocks in the horizontal direction and 32 blocks in the vertical direction are arranged in a matrix with each block forming unit as shown in FIG. 5, parity data in the horizontal (row) direction are added to the matrix of 16×32 as 17th and 18th columns, and parity data in the vertical (column) direction are added to the matrix as a 33rd row, so that there are totally 18×33 blocks.

Further, in this case, if it is assumed that the blocks B are taken as from $B_1$ to $B_{594}$ sequentially and with respect to the first row, the following modulo-2 addition operations are performed with the block unit at every other one block in the horizontal direction to thereby provide horizontal parity data $B_{17}$ and $B_{18}$ of the first row.

$$B_1 \oplus B_3 \oplus B_5 \oplus \ldots \oplus B_{15} = B_{17}$$

$$B_2 \oplus B_4 \oplus B_6 \oplus \ldots \oplus B_{16} = B_{18}$$

Similarly, horizontal parity data on the 2nd to 33rd rows are provided.

As to the first column, carried out are the following modulo-2 additions with the block unit in the vertical direction to provide vertical parity data $B_{577}$ of the first column.

$$B_1 \oplus B_{19} \oplus B_{37} \oplus \ldots \oplus B_{559} = B_{577}$$

Similarly, vertical parity data on the 2nd to 16th columns are provided.

These horizontal and vertical parity data and block parity data are used to enhance the data error correcting ability upon reproduction.

The signal process to provide the above horizontal and vertical parity data and add the same to the data is performed in the error correcting encoders 13AB and 13CD, while the signal process to provide the sync signal SYNC, identification signal ID and address AD and add the same to the data is performed in the recording processors 14AB and 14CD.

In the processors 14AB and 14CD, there is carried out block-encoding such that the number of bits per sample is converted from 8 bits to 10 bits. This block-encoding is a conversion such that $2^8$ code words in 10 bits ($2^{10}$) are selected whose DSV (Digital Sum Variation) is 0 or nearly 0 and the original code of 8 bits is transformed one-for-one to the selected words to provide the code of 10 bits. In other words, such a conversion is carried out that the DSV of the recording signal becomes zero as near as possible and accordingly "0" and "1" appear substantially homogeneous. Such block-encoding is carried out because dc components can not recovered upon reproduction by an ordinary magnetic head.

Thus block encoded digital signal of 10-bit word is further converted in the processors 14AB and 14CD from a parallel signal to a serial signal in sequence from the block $B_1$ to the block $B_{594}$. At top and end of the digital signal to one field period of each channel, a pre-amble signal and a post-amble signal are added, respectively.

The serial digital signals are separated for each channel, delivered from the processors 14AB, 14CD and delivered through recording amplifiers 15A, 15B, 15C and 15D to output terminals 16A, 16B, 16C and 16D, respectively.

Figure 6:
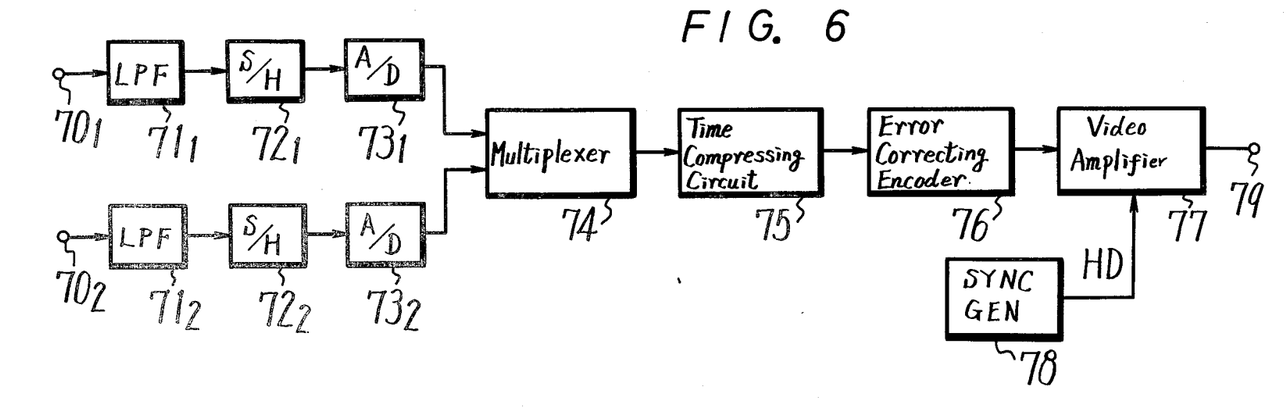
FIG. 6 is a systematic block diagram showing an example of the digital processing circuit at the recording side of the digital video processor.

Analog audio signals collected by the microphones $M_1$ to $M_{16}$ are fed to the digital audio processor 7. The recording-processing circuit of the digital audio processor 7 is shown in FIG. 6. That is, if the audio signals of 2 channels are taken into consideration, the signals of the respective channels are supplied through input terminals $70_1, 70_2$ and low pass filters $71_1, 71_2$ to sampling hold circuits $72_1, 72_2$, respectively. In this case, a sampling frequency $f_{AS}$ of the audio signal is selected as 50.4/1.001 KHz. In the case of the NTSC color video signal, in order to avoid the beat between the audio subcarrier and color subcarrier, the frame frequency is selected higher than 30 Hz by 1/1000 Hz, and further when the audio signal is time-base compressed, the compressing ratio has to be determined to make the frequency of the sampling frequency, which is compressed, as an integer time as the horizontal frequency $f_H$. Therefore, the sampling frequency $f_{AS}$ for the audio signal is selected as the compressing ratio becomes as noted above.

Now, the relation between the sampling frequency $f_{VS}$ of the video signal and the sample frequency $f_{AS}$ of the audio signal will be explained.

$$f_{AS} = \frac{8}{7} \cdot \frac{14}{5} \cdot f_H \quad (1)$$

$$= \frac{8}{7} \cdot \frac{14}{5} \cdot \frac{2}{455} \cdot f_{SC}$$

$$= \frac{32}{2275} \cdot f_{SC}$$

$$f_{VS} = 4 \cdot f_{SC} \quad (2)$$

$$\therefore f_{AS} = \frac{8}{2275} \cdot f_{VS} \quad (3)$$

The data thus sampled are fed to A–D converters $73_1$ and $73_2$ respectively for converting into digital signals of 16 bits per 1 sample.

The serial digital signals from the A-D converters $73_1$ and $73_2$ are both fed to a multiplexer 74 and time-sharing-processed such that the data of the first channel and the data of the second channel appear alternatively at every one sample. The output data from the multiplexer 74 are then fed to a time compressing circuit 75 which includes a RAM (random access memory). The output data are therein interleaved data block by data block, and time-compressed for making room for error detection and error correction codes at a predetermined time compressing ratio and then fed to an error correcting encoder 76 for adding error detecting codes and error correcting codes to the time-compressed data stream.

The digital audio signal from the error correcting encoder 76 is fed to a video amplifier 77. A sync signal generating circuit 78 is provided, and the television sync signal and data sync signal therefrom are also fed to the video amplifier 77 in which the above sync signals are added to the audio data and then they are delivered to an output terminal 79.

The above description is given in the case of the 2 channels, but in the case of 16 channels it is sufficient to say that the digital data of 16 channels of the audio signal are time sharing-processed in the multiplexer 74.

The digital signals of 4 channels are supplied to the VTRs 3 and 4 and the digital signals from the digital audio processor 7 are supplied through the audio switcher 8 to the VTR 3 or 4.

Figure 8A:
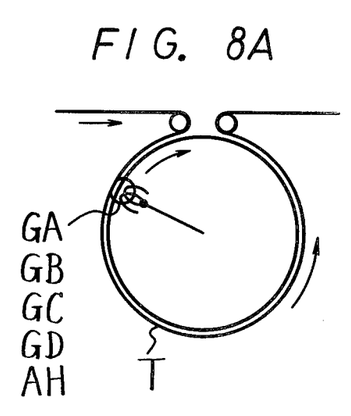
FIGS. 8A and 8B are schematic diagrams used to explain an example of the rotary magnetic head assembly of a VTR.
Figure 8B:
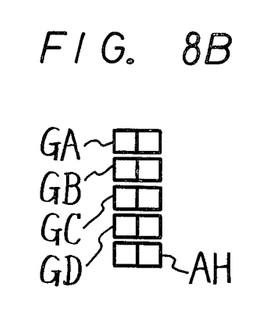

Each of the VTRs 3 and 4 has 4 rotary magnetic heads GA, GB, GC and GD and one rotary magnetic head AH as shown in FIGS. 8A and 8B. These 5 heads GA, GB, GC, GD and AH are located closely and sequentially displaced along the rotary axis and approximately in-line. They are rotated at the field frequency of 60 Hz in synchronism with the color video signal. A magnetic tape T is helically wrapped around the rotary surface of the heads GA, GB, GC and GD in an omega-shape and also is transported at a constant speed.

Figure 9:
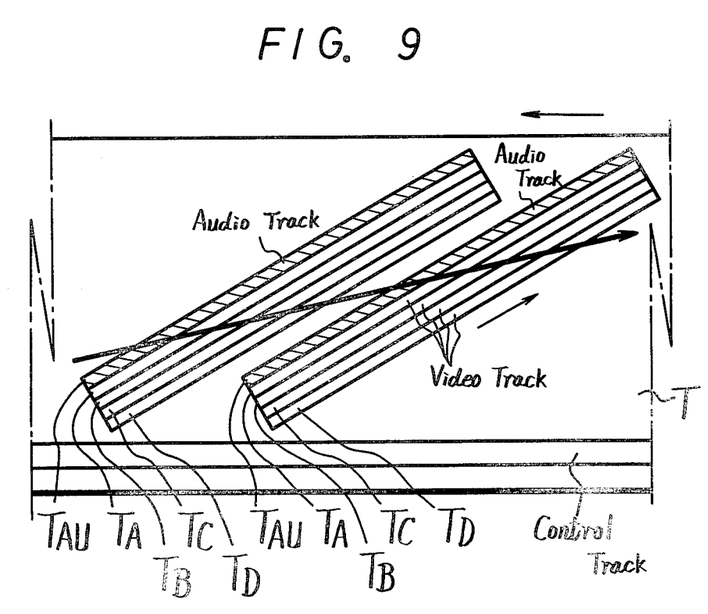
FIG. 9 is a format showing one example of the recording track pattern.

When, for example, the VTR 3 is in a recording mode, the digital video signals of the A-, B-, C- and D-channels are respectively recorded in the VTR 3 by the heads GA, GB, GC, and GD on the tape T as four slant tracks $T_A$, $T_B$, $T_C$ and $T_D$ for each one field as shown in FIG. 9. Also the digital audio signal is recorded on the tape T as a slant track $T_{AU}$ by the head AH.

In this example, the track widths of the heads GA, GB, GC, GD and AH and the distance between adjacent ones thereof are so selected that a set of the tracks $T_A$, $T_B$, $T_C$, $T_D$ and $T_{AU}$ correspond to 1 video track with the SMPTE "C" format.

Now, there is taken into consideration the number of samples that can be included in 1 field with an 8-bit unit when it is converted into the digital data sample of the video signal where the data rate of the audio signal is taken as $R_A$.

At first, the data rate $R_A$ of the audio signal is calculated.

One sample of the audio signal is 16 bits and the number of audio channels is sixteen. Thus, if the redundancy of the error correcting code, sync signal etc. is taken as 100%, the total data rate $R_A$ is expressed as follows:

$$R_A = (16 \times 2) \times 16 \times f_{AS} \quad (4)$$

$$= \frac{4096}{2275} \cdot f_{VS}$$

$$= 25.779 \, M \, \text{bit/s}$$

Accordingly, a sample number $N_A$ of the digital audio signal inserted per one field becomes as follows:

$$N_A = R_A \times \frac{1}{8} \times \frac{1.001}{60} \quad (5)$$

$$= \frac{4096}{2275} \times 4 \times f_{SC} \times \frac{1}{8} \times \frac{1.001}{60}$$

$$= 53760$$

Since the number of video samples in one line is 910 as set forth previously, when the audio data rate is converted into the data rate of the digital video signal, the number of audio samples to be interposed in one television field is expressed as follows:

$$\frac{53760}{910} = 59.0769 \, \text{(lines)} \quad (6)$$

That is, about 60 lines are necessary.

Accordingly, since the number of the effective video lines is 256, the audio signal data require about ¼ of the capacity of the video signal data. Hence, the occupying ratio of the audio signal data in the total data of the video and audio signals is about 20%.

Consequently, one audio track and four video tracks are sufficient for per one field.

In practice, it is difficult to precisely arrange 5 heads to be in-line relation so that the effect of leakage fluxes from adjacent heads is negligible. Consequently, the 5 heads GA, GB, GC, GD and AH are sequentially dislocated in the rotary direction. In this case, the record starting positions of the respective tracks $T_A$, $T_B$, $T_C$, $T_D$ and $T_{AU}$ are not theoretically aligned as shown in FIG. 9. However, if the digital signals of 4 channels or A- to D-channels and the digital audio signal are respectively given with relative delays and then they are supplied to the heads GA, GB, GC, GD and AH upon recording, the track pattern on the tape T can be formed similar to those formed by the 5 heads arranged in-line shown in FIG. 9.

As described above, the digitized color video signal and associated digitized audio signal can be recorded in digital form.

Now, the reproduction of the digital signal recorded as above will be explained.

When the VTR 3 is changed to a reproducing mode, the digital data of the respective channels are reproduced substantially at the same time by the heads GA, GB, GC and GD from the tracks $T_A$, $T_B$, $T_C$ and $T_D$ and substantially at the same time the digital audio signal is also reproduced by the head AH from the track $T_{AU}$. In this case, if the haeds GA, GB, GC, GD and AH are sequentially dislocated in the rotating direction as set forth above, the digital signals of the reepective track are reproduced in a sequentially delayed format. However, these delays can easily be corrected by using, for example, a buffer memory.

The reproduced digital video signal is fed to the processor DVP-3 of the digital video processor 1 and the reproduced digital audio signal is fed through the audio switcher 8 to the digital audio processor 7.

Figure 3:
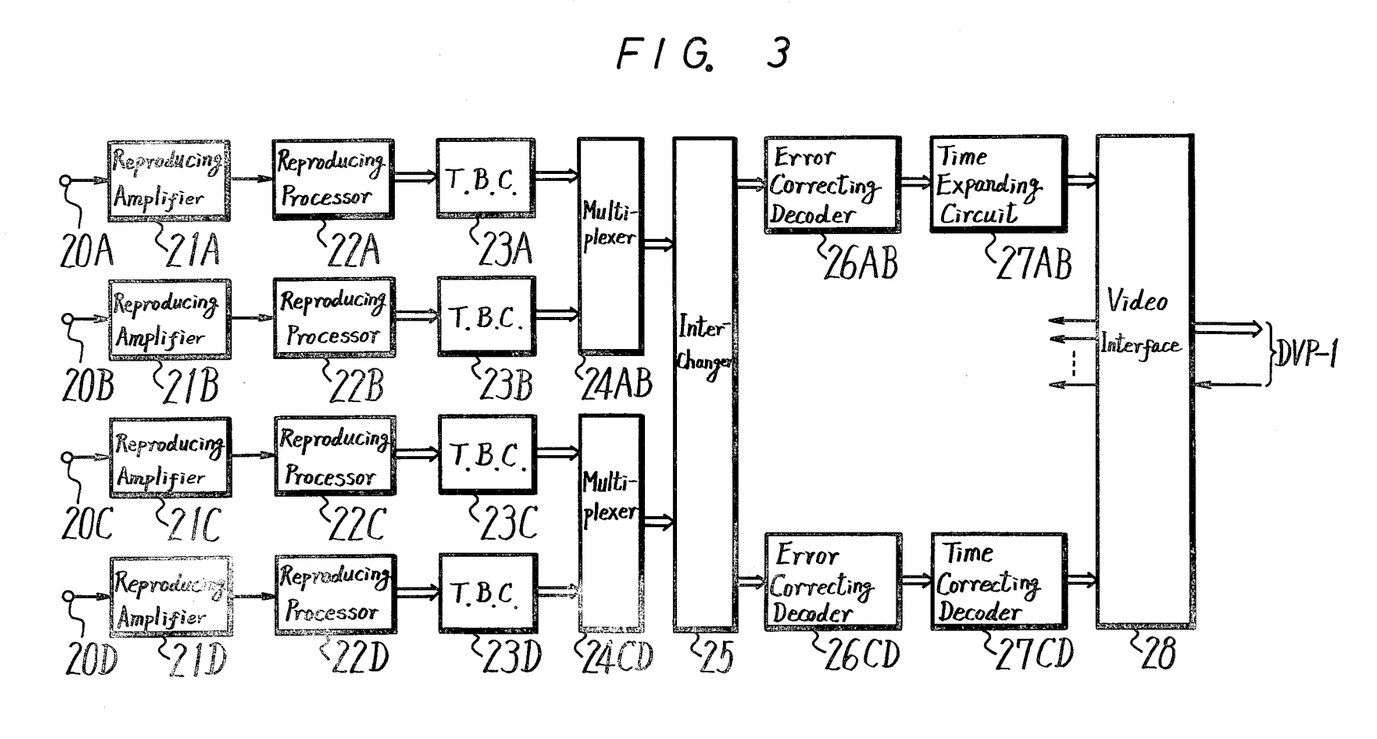
FIG. 3 is a systematic block diagram showing an example of the digital processing circuit at the reproducing side thereof.

At first, the reproduction of the digital video signal will be described. The video processor DVP-3 is constructed as shown in FIG. 3. That is, the digital signals of 4 channels are respectively applied to its input terminals 20A, 20B, 20C and 20D and then supplied through reproducing amplifiers 21A, 21B, 21C and 21D to reproducing processors 22A, 22B, 22C and 22D in which they are respectively converted from the serial signal to the parallel signal and also block-decoded from the 10-bit code to the original 8-bit code. Also, a clock signal is generated by a phase locked loop (PLL) based on the reproduced digital signal.

The parallel 8-bit digital signals are respectively fed to TBCs (time base correctors) 23A, 23B, 23C and 23D for removing their time base fluctuation components. As is well known, the TBCs 23A, 23B, 23C and 23D each include a digital memory, and the block sync signal SYNC is used to detect the start of the following data signal. The writing operation to the memory is carried out based on the clock from the processors 22A, 22B, 22C and 22D. The reading operation from the digital memory is performed by the clock provided based on the reference sync, whereby the time base fluctuation component is removed.

The signals from the TBCs 23A and 23B are both fed to a multiplexer 24AB, and the signals from the TBCs 23C and 23D are both fed to a multiplexer 24CD. Then, in the multiplexer 24AB, digital signals of an A-channel and a B-channel are processed in a time sharing manner to be alternated sample by sample and, in the multiplexer 24CD, digital signals of a C-channel and a D-channel are also processed in a time sharing manner to be alternated sample by sample.

The digital data from the multiplexers 24AB and 24CD are each applied through an interchanger 25 to error correcting decoders 26AB and 26CD. In this interchanger 25, the respective channels are identified by the track identification signals among the identification signals added to the respective blocks, and the block data are distributed to the corresponding channels. In this interchanger 25, the process is of course carried out in a time sharing manner.

The interchanger 25 operates effectively, especially in a special reproducing mode. That is, upon a normal reproducing mode where the position of the record track on the magnetic tape and the running trace of the rotary head thereon are coincident, the 4 rotary heads reproduce the recorded signals only from the corresponding tracks. However, upon special reproducing mode such as a high speed reproducing mode where the running speed of the magnetic tape is selected as several tens of times that of the normal reproducing speed, the rotary heads scan across a plurality of the tracks as shown by an arrow in FIG. 7 by an arrow. Therefore, the respective heads GA, GB, GC and GD each reproduce such a signal in which the signals from the A-, B-, C- and D-channels are mixed.

In the above case, the interchanger 25 discriminates the channel identification based upon the track identification signal and the reproduced signals from the tracks $T_A$ and $T_B$ are both fed to the decoder 26AB for the AB-channel and the reproduced signals from the tracks $T_C$ and $T_D$ are both fed to the decoder 26CD for the CD-channel.

The decoders 26AB and 26CD each include a field memory having a capacity to memorize the data of one channel of one field. Thus, the data of the A- and B-channels and the data of the C- and D-channels are respectively processed in the decoders 26AB and 26CD in a time sharing manner as follows. That is, the data are written in the field memory at every block B in response to the address signal AD and simultaneously the error of the data is corrected by the block parity data and horizontal and vertical parity data. As to the error correction, the error within the block unit is first corrected by the block parity data, then the error correction by the horizontal parity data is achieved, and finally the error correction by the vertical parity data is achieved.

Thus error corrected data are respectively applied to time base expanding circuits 27AB and 27CD, in which the data are respectively time-expanded at every channel and recovered to restore the original signal format.

The video signal data from the time base expanding circuits 27AB and 27CD both are fed to a video interface 28, and converted into the original single channel digital data. The data are then fed to the first processor stage DVP-1. In the video processor stage DVP-1, the digital signal is D-A converted, and is further added with the sync pulse and color burst signal to be obtain the original color video signal, and the resulting signal is then fed to, for example, the monitor television receiver 5. In this case, also the various timing pulses generated based upon the reference clock pulse derived from the signal generator in the processor stage DVP-1 are respectively supplied through the video interface 28 to respective circuits of the reproducing processor circuits.

In the above reproducing system, the data proceeding from the heads GA, GB, GC and GD to the write-in side of the TBCs 23A, 23B, 23C and 23D use the clock pulse extracted from the reproduced data, but the data proceeding from the read-out side of the TBCs 23A, 23B, 23C and 23D to the output terminals use the clock pulse derived from the signal generator in the processor DVP-1.

Figure 7:
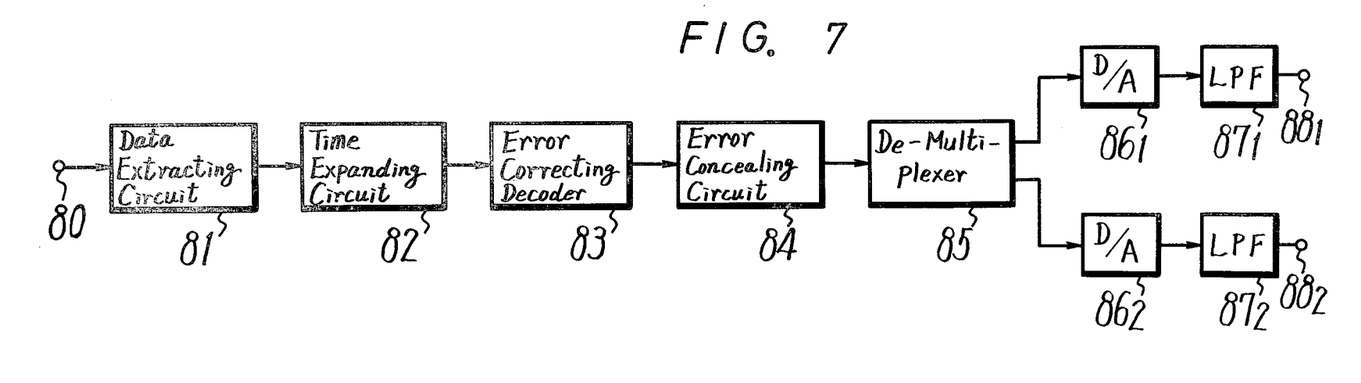
FIG. 7 is a systematic block diagram showing an example of the digital processing circuit at the reproducing side thereof.

Meanwhile, the reproduced digital audio signal, supplied to the digital audio processor 7 by way of the audio switcher 8 is reproduced as follows. The reproducing processor circuit of the digital audio processor 7 is constructed, for example, as shown in FIG. 7. The reproduced signal fed through an input terminal 80 is supplied to a data extracting circuit 81 in which the television sync and data sync signals and the data are extracted based on the clock signal generated therein.

The data thus extracted are fed to a time base expanding circuit 82, where the audio data are de-interleaved to be of the original code arrangement having the original time base. The digital signal thus processed is then fed to an error correcting decoder 83, where the errors thereof are corrected based on the error detecting code and the error correcting code.

When the error of the data can not be corrected at the error correcting decoder 83, the digital data signal is fed to an error concealing circuit 84 of the next stage in which the remaining error is concealed by mean value interpolation using the mean value of the words before and after the erroneous word or pre-value hold interpolation.

Thus error corrected and concealed digital signal is fed to a de-multiplexer 85 in which the signal is distributed to the original first and second channel signals. The first channel signal is fed to a D-A converter 86₁ and converted into the analog signal which is delivered through a low pass filter 87₁ to an output terminal 88₁, while the second channel signal is fed to a D-A converter 86₂, converted into an analog signal and delivered through a low pass filter 87₂ to an output terminal 88₂.

The above description is given on the case of 2 channels, but the above reproducing system can be applied to the case of 16 channels with the same process except that the digital signal is distributed to the signals of 16 channels by the de-multiplexer 85.

The analog audio signals of the respective channels thus obtained from the digital audio processor 7 are respectively supplied to the speakers $SP_1$, $SP_2$, ... $SP_{16}$. By the above manner, the digital video and audio signals can be reproduced.

Upon the reproduction, the number of blocks having errors is indicated on the monitor 6 by the analyzer ANA in the digital video processor 1.

Figure 10:
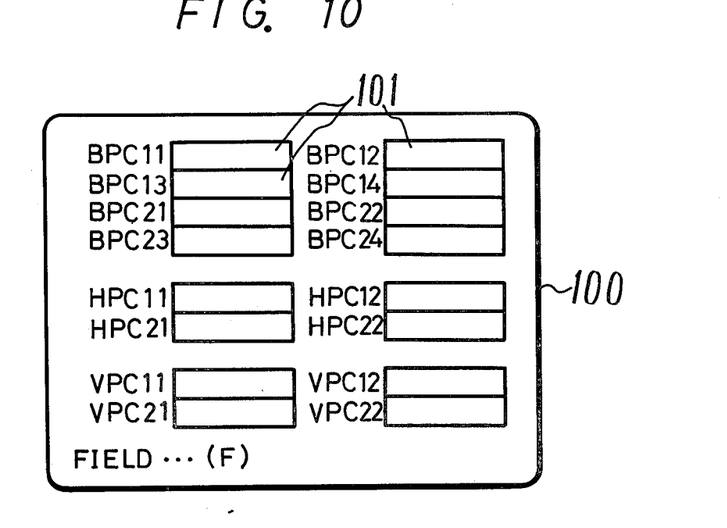
FIG. 10 is a diagram showing an example of the error display.

FIG. 10 illustrates the display format of the monitor receiver 6 on which, by way of example, the number of blocks having errors is indicated. In the figure, reference numeral 100 designate a picture screen of the monitor receiver 6 and within each of the frames 101 each surrounded by a square, for example, 10 figures in decimal number can be displayed to display the number of erroneous blocks. The letters marked at the left side of each of the square frames 101 are indices which show the display status. That is, the followings are respectively displayed in the frames.

(i) The letters BPC 11, BPC12, BPC21 and BPC22 represent the numbers of erroneous blocks which will appear in from the first channel to the fourth channel.

(ii) The letters BPC13, BPC14, BPC23 and BPC24 represent the numbers of erroneous blocks of the respective channel which can not be corrected by the block parity data.

(iii) The letters HPC11, HPC12, HPC21 and HPC22 represent the numbers of erroneous blocks after the error is corrected by the horizontal parity data.

(iv) The letters VPC11, VPC12, VPC21 and VPC22 represent the numbers of erroneous blocks after the error is corrected by the vertical parity data.

In FIG. 10, the letters FIELD ... (F) appearing on the lower portion of the picture screen 100 represent that the displayed number of erroneous blocks is obtained over F fields. For example, if "FIELD ... (60)" is displayed, it represents that the number of blocks displayed is obtained from data of 60 fields.

When the editing operation is required between the VTRs 3 and 4, the reproduced digital signal from the VTR 3 through the reproducing processor DVP-3 of the digital video processor 1 are fed directly to the recording processor DVP-2 and the output signal therefrom is fed, for example, to the VTR 4 and recorded therein.

In the digital audio processor 7, the output from the error concealing circuit 84 of the reproducing system is fed to the time base compressing circuit 75 of the recording system, and the output derived at the output terminal 79 is applied to the VTR 4.

A tracking servo for an ordinary VTR is sufficient for the VTRs 3 and 4 when they are in the recording and reproducing modes.

As described above, the video signal data of one television line are divided into a plurality of blocks whose number is twice the number of rotary magnetic heads for recording the video signal, and two blocks of the plurality of video signal data blocks are distributed to the respective heads i.e. channels and recorded thereby according to the present invention. Therefore, the following effect can be achieved. If the dividing number of the data of one line is selected the same as the number of rotary magnetic heads for the video signal, the unit block for error correcting becomes too large for error correction and hence the error correction becomes rough. However, if the above dividing number is selected more than three times as that of the rotary magnetic heads, the redundancy becomes too great.

Contrary to the above, according to the present invention, the above-mentioned defects are avoided, and the good error correction and proper redundancy are achieved.

According to the illustrated example of the invention when the video signal data are distributed to the channels, the data of one line are roughly divided into two blocks, each of divided ($\frac{1}{2}$) data portion is divided into blocks whose number corresponds to a plurality of channels and thus divided blocks are respectively distributed to the channels in sequence. Therefore, when the data of one field are distributed to the channels and processed, a delaying buffer memory of a small capacity which is used to make the data of the respective channels in time is sufficient.

Further, in the illustrated example of the invention, since two channels in four channels are signal-processed in time sharing manner by the digital processor stages DVP-2 and DVP-3 recording and/or reproducing the video signal, the circuit construction can be much simplified and made compact and inexpensive.

Further, according to the illustrated example of the invention, a separate track is formed for the audio signal so that upon edition the video signal and audio signal can easily be recorded and inserted independently.

Figure 11:
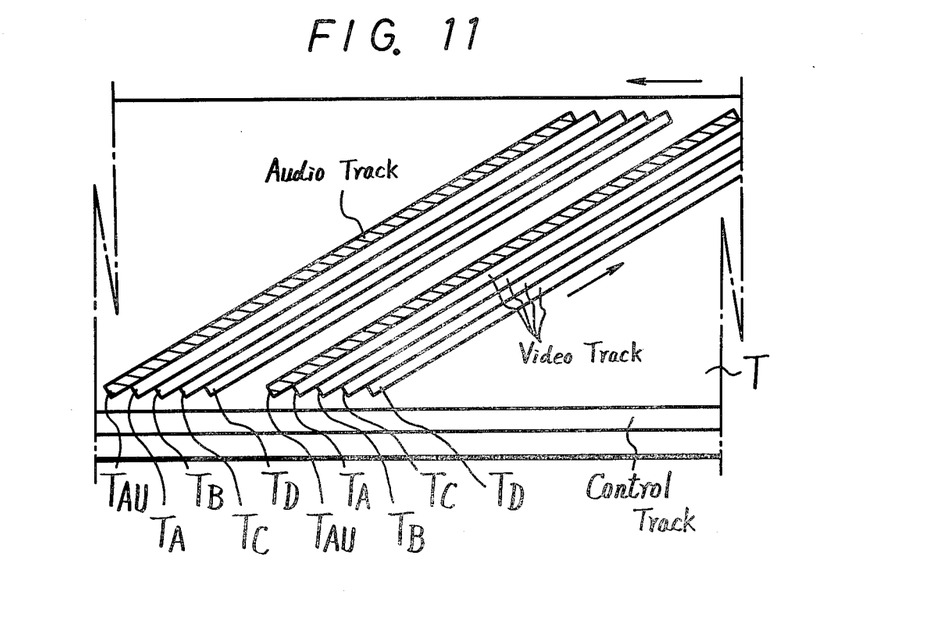
FIG. 11 is a format showing another example of the recording track pattern.

In the illustrated example, although the signals fed to five rotary heads are given with relative delays to form the track pattern similar to that formed by the rotary heads located in-line, it may be possible that the manner that the relative delays are imparted to the signals is varied to form a track pattern which effectively utilizes the width direction of the tape T as shown in FIG. 11.

It will be apparent that many modifications and variations could be effected by one skilled in the art without departing from the spirit or scope of the present invention, which is to be ascertained from the appended claims.

We claim as our invention:

1. Digitized video data recording apparatus comprising:
   a tape guide drum about the periphery of which a magnetic tape is transported at a predetermined wrap angle;
   a plurality of rotary magnetic heads associated with said guide drum for scanning respective parallel slant tracks on said magnetic tape;

means for providing a digitized video signal comprised of horizontal scanning intervals;

signal processing means for arranging the digitized video data of each horizontal scanning interval into a number of data blocks, which number is twice the number of said heads; and signal distributing means for distributing two blocks of the digitized video data to each of said heads.

2. Digitized video data recording apparatus according to claim 1, wherein said signal processing means arranges said digitized video data of each horizontal scanning interval into eight blocks, and said signal distributing means distributes said blocks of said digitized video data so that every fourth block of each horizontal scanning interval is distributed to a respective one of said heads.

3. Digitized video data recording apparatus according to claim 1, wherein each said block has associated therewith identification data for determining the natural sequence of said blocks, and said apparatus further comprises interchanger means for correcting the order of the reproduced blocks of digitized video data on the basis of said identification data.

4. Digitized video data recording apparatus according to claim 1, further comprising means for adding parity data to each said block prior to recording, and means for correcting errors occurring in the reproduced blocks on the basis of said parity data.

5. Digitized video data recording apparatus according to claim 1, further comprising a further rotary magnetic head disposed on said guide drum for scanning additional slant tracks on said magnetic tape in which digitized audio data are recorded.

6. Digitized video recording apparatus according to claim 1, wherein said plurality of magnetic heads are arranged in line in the direction normal to the scanning direction of said heads.

7. Digitized video recording apparatus according to claim 1, wherein said plurality of magnetic heads are arranged on said guide drum in a staggered fashion such that said slant tracks have ends aligned in the direction of transport of the tape.

8. Digitized video data recording apparatus according to claim 1, wherein said video signal is a color video signal having a color component carried on a color subcarrier, and said means providing a digitized video signal includes quantizing means for quantizing said video signal using a sampling frequency four times the frequency of said color subcarrier.

9. Digitized video data recording apparatus according to claim 1; wherein said number of heads is four.

10. Digitized video data recording apparatus according to claim 9; wherein said blocks of said digitized video data to be distributed to two of said heads are processed in one of said channels.

11. Digitized video data recording apparatus according to claim 9; wherein said blocks are multiplexed sample by sample.

* * * * *